United States Patent [19]

Hawk et al.

[11] 4,306,335

[45] Dec. 22, 1981

[54] METHOD AND APPARATUS FOR CUTTING POULTRY

[76] Inventors: Charles A. Hawk, 7195-12th St., Minerva, Ohio 44657; Hershey Lerner, 311 W. Streetsboro St., Hudson, Ohio 44236

[21] Appl. No.: 148,583

[22] Filed: May 9, 1980

[51] Int. Cl.³ .............................................. A22C 21/00
[52] U.S. Cl. ........................................... 17/52; 17/11
[58] Field of Search ................................ 17/11, 45, 52

[56] References Cited

U.S. PATENT DOCUMENTS 3,639,945  2/1972  Duncan et al. ............... 17/52 X
3,943,600  3/1976  Cramer ........................ 17/52 X
4,016,624  4/1977  Martin et al. ................. 17/52 X
4,083,083  4/1978  Duncan et al. ............... 17/52 X

*Primary Examiner*—Willie G. Abercrombie
*Attorney, Agent, or Firm*—Frease & Bishop

[57] ABSTRACT

An apparatus and a method is disclosed for cutting poultry, previously cut into front halves and rear halves, wherein each half is automatically and simultaneously cut into a desired number of pieces, a bucket conveyor being synchronized with the cutting operations so as to eventually receive a complete cut-up chicken in a single bucket.

9 Claims, 4 Drawing Figures

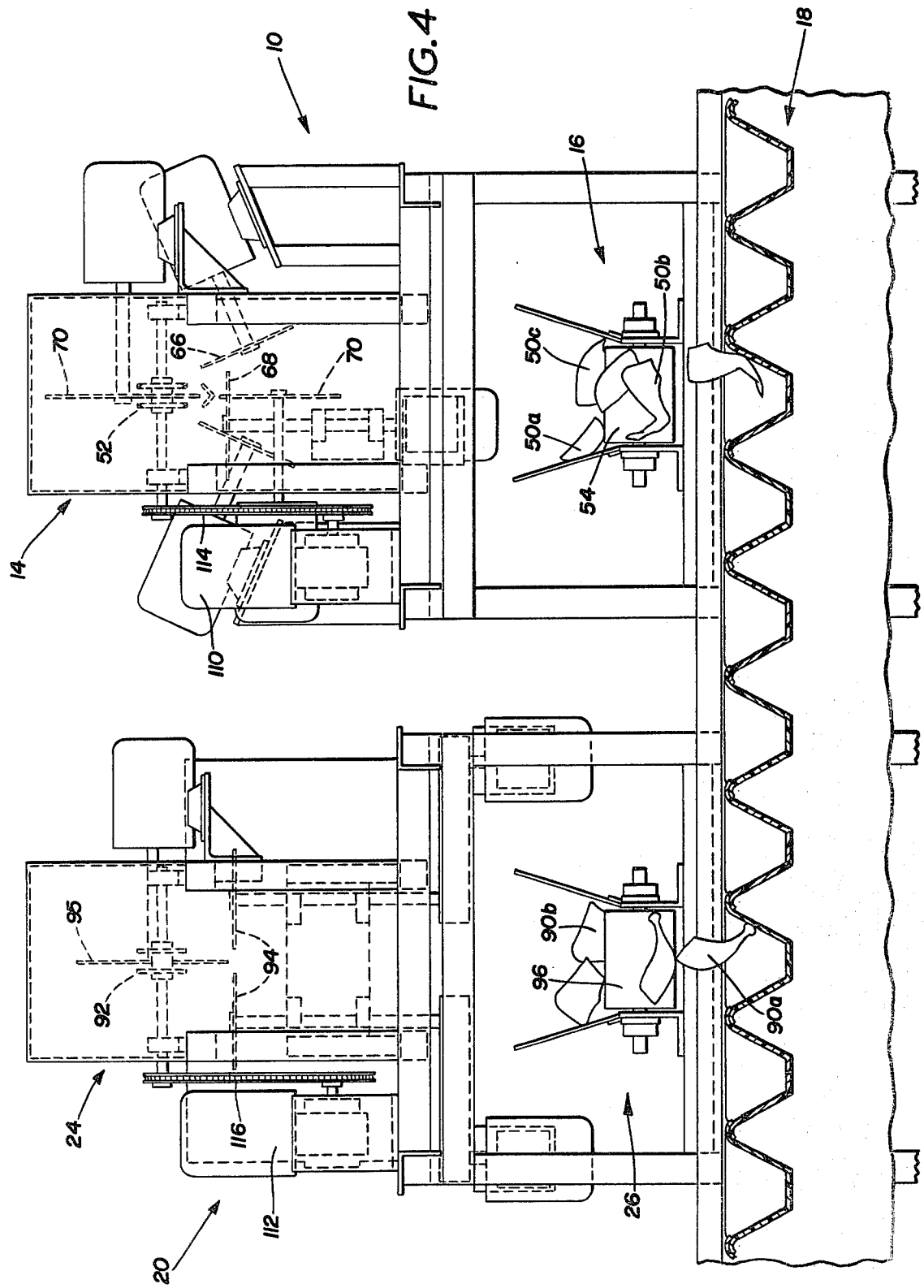

METHOD AND APPARATUS FOR CUTTING POULTRY

BACKGROUND OF THE INVENTION

1. Field of the Invention

The present invention relates to a method and apparatus for cutting poultry, in particular, chicken, into parts; and more particularly, to a method and apparatus for regrouping into one container for packaging in one package the individual parts which comprise one chicken.

2. Description of the Prior Art

Various methods and apparatus for cutting chicken into individual parts for use by food stores, restaurants, fast food carryouts, or other purveyors of chicken, have been used in the past. In these prior systems, the chicken is cut transversely in half to form a front half and rear half, the front half including the wings and breasts, and the rear half including the legs and thighs. The front half is then cut into pieces or sections by cutting the wings and, thereafter, splitting the breast section longitudinally in half to provide two breast pieces. In other systems the front half may be sectioned into five pieces by first removing the lower portion of the breast area, known in the trade as the keel, then removing the wings, and finally longitudinally splitting the remaining portion of the breast into two rib pieces.

The rear half of the chicken is split into pieces by first cutting the legs from the thighs and then longitudinally splitting the two thighs to provide four pieces of chicken. In these prior cutting devices, the severed pieces normally, after being severed, drop to a chute and slide into a container containing the individual pieces. That is, a container will include all legs, another container will include all thighs, and so forth.

Certain customers of a chicken processing plant, however, desire to receive the cut chicken pieces in packages containing the individual parts of one chicken. That is, an individual package will contain, in the case of a nine-piece cut, two thighs, two legs, two wings, two rib sections and a keel section. None of the prior art of which we are aware has provided a method and apparatus for sectioning chicken and regrouping the pieces in containers containing the individual parts of one chicken. In the prior art, this regrouping has had to be accomplished by manual labor, which of course is more expensive than if done automatically.

Accordingly, it is an object of the present invention to provide an improved method and apparatus for cutting poultry, in particular chickens, into individual pieces and regrouping these pieces into individual containers after severing, each of which contains the severed parts of one chicken. Additionally, it is an object of the present invention to provide an improved method and apparatus for cutting poultry into individual pieces and package them into individual containers containing the parts of one chicken without the use of manual labor to place the individual severed parts of the chicken into the package.

These and other objectives are obtained by the methods, steps, procedures, parts, constructions, combinations and subcombinations which comprise the present invention, the preferred embodiment of which is set forth and illustrated in the accompanying drawings, and which is particularly pointed out and set forth in the appended claims.

SUMMARY OF THE INVENTION

In the present invention the methods and apparatus are suitable for cutting and packaging poultry into individual parts, such poultry including chicken, ducks, geese and the like. However, for simplicity throughout the description, the poultry will be referred to as chicken.

In accordance with the present invention, chicken which has been eviscerated and which has been cut transversely in half to provide a front half and a rear half, is conveyed to feeding stations, one for the front half and one for the rear half. The front half and rear half are placed on feed conveyors which include holders which are adapted to convey, respectively, the front and rear half into a cutter. Both the front half conveyor and the rear half conveyor are operated from a common drive, and thus, operate at the same speed, and the chicken halves are carried in tandem so that a front half is conveyed into the front half cutter at the same time that the rear half is conveyed into the rear half cutter.

As the chicken halves pass into the cutter, they are conveyed past a series of cutting wheels which section the halves into pieces. The cutter conveyor is synchronized with the feed conveyor. In the case of the front half, as the half passes through the cutter, the keel portion is cut first, then the wings are removed, and finally the remaining breast portion is split longitudinally, each of these cutting operations being accomplished by cutting wheels which are located to provide for the appropriate cut. As the pieces are cut, they drop to a delivery conveyor located below the cutting wheels and are delivered to a series of containers which are in the form of a bucket conveyor. The delivery conveyor is synchronized with, and thus, travels at the same speed as both the cutting conveyor and feed conveyor. Consequently, as a chicken half passes through the cutter, the pieces of that half, as cut, will fall onto the delivery conveyor into a pile so that when the five pieces of the front half are delivered to a bucket, they would all be delivered together.

The operation of the rear half cutter is substantially the same as for the front half, except that the cutters are located in different positions so as to cut the rear half of the chicken into the appropriate pieces. Thus, as the rear half of the chicken is conveyed to the container by the feed conveyor, it is conveyed through the cutter mechanism in synchronization with all of the conveyors of the front half section. Further, the rear half cutter includes a delivery conveyor which likewise is operated in synchronization with the other conveyors of the entire mechanism so that as the rear half passes through the cutters and the legs are cut, they fall to the delivery conveyor, and then the thighs are longitudinally split and they fall to the delivery conveyor in a pile with the legs which have just been cut.

Finally, the bucket conveyor, which conveys the individual pieces to a package station, is also operated in synchronization with the other conveyors of the apparatus. Thus, the front half conveyor will deposit five pieces of chicken into an empty bucket and that bucket is advanced bucket-by-bucket to the rear half delivery conveyor. The advancement of the buckets on a bucket-by-bucket basis is accomplished by each bucket being moved a distance equal to the width of the bucket by a switch which activates the bucket conveyor motor, which switch is activated in synchronization with the parts of the other conveyors of the system.

As a result, two halves of a chicken pass through the cutting portion of the system in tandem and the two halves of the system deposit their respective pieces of chicken into the buckets at the same time. In the embodiment illustrated, the front half cutter will deposit five pieces of chicken into an empty bucket, while the rear half conveyor will deposit four pieces of chicken, into a bucket in which previously has been deposited five pieces by the front half deposit conveyor.

BRIEF DESCRIPTION OF THE DRAWINGS

By way of example, the improved method and apparatus for cutting poultry are illustrated in the accompanying drawings forming a part thereof, wherein similar numerals refer to similar parts throughout the various figures and in which:

FIG. 4 is an elevation showing the discharge side of the apparatus of the present invention.

DESCRIPTION OF THE PREFERRED EMBODIMENT

Figure 1:
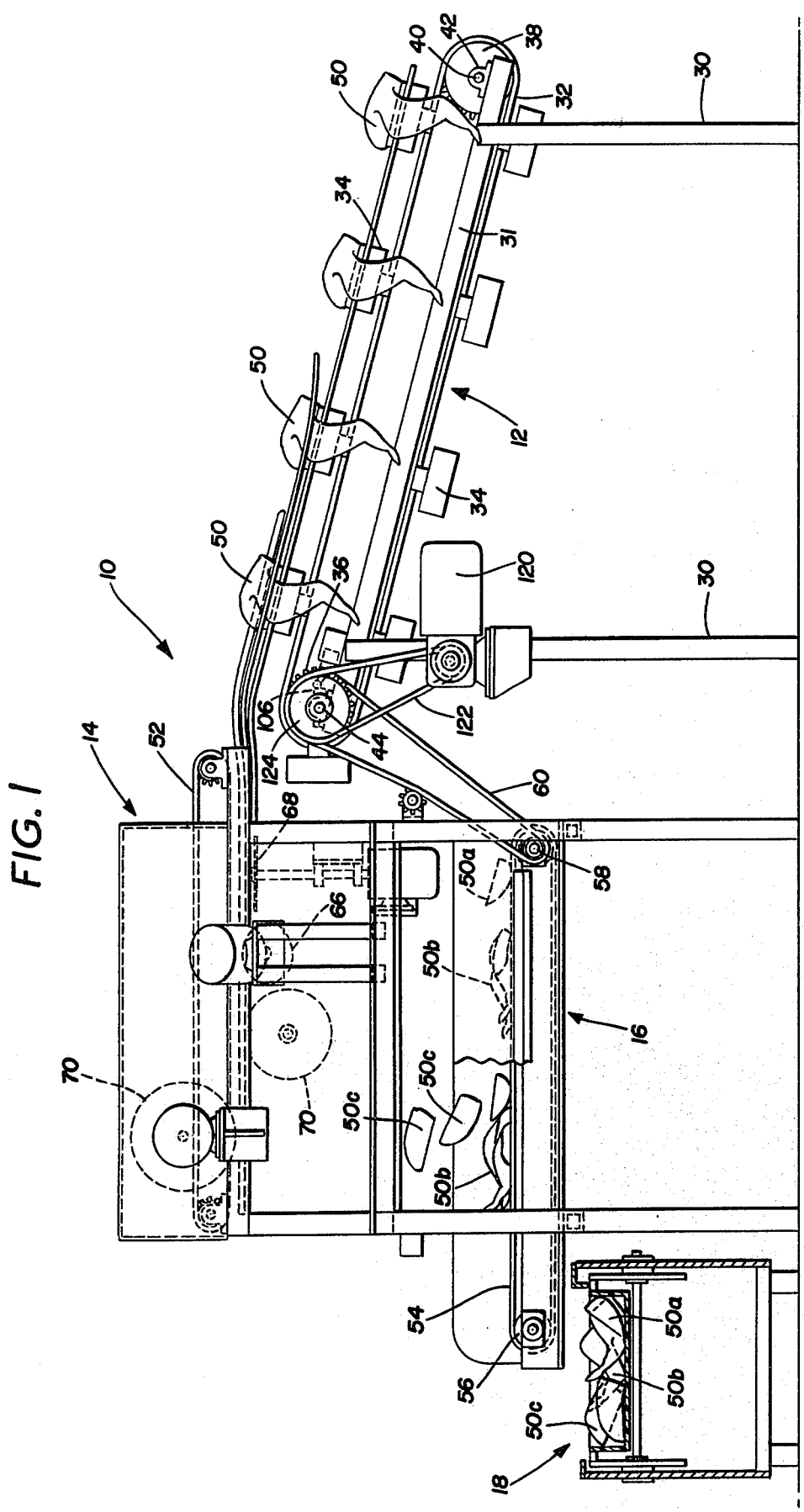
FIG. 1 is a side elevation of the front half conveyor apparatus of the present invention.
Figure 2:
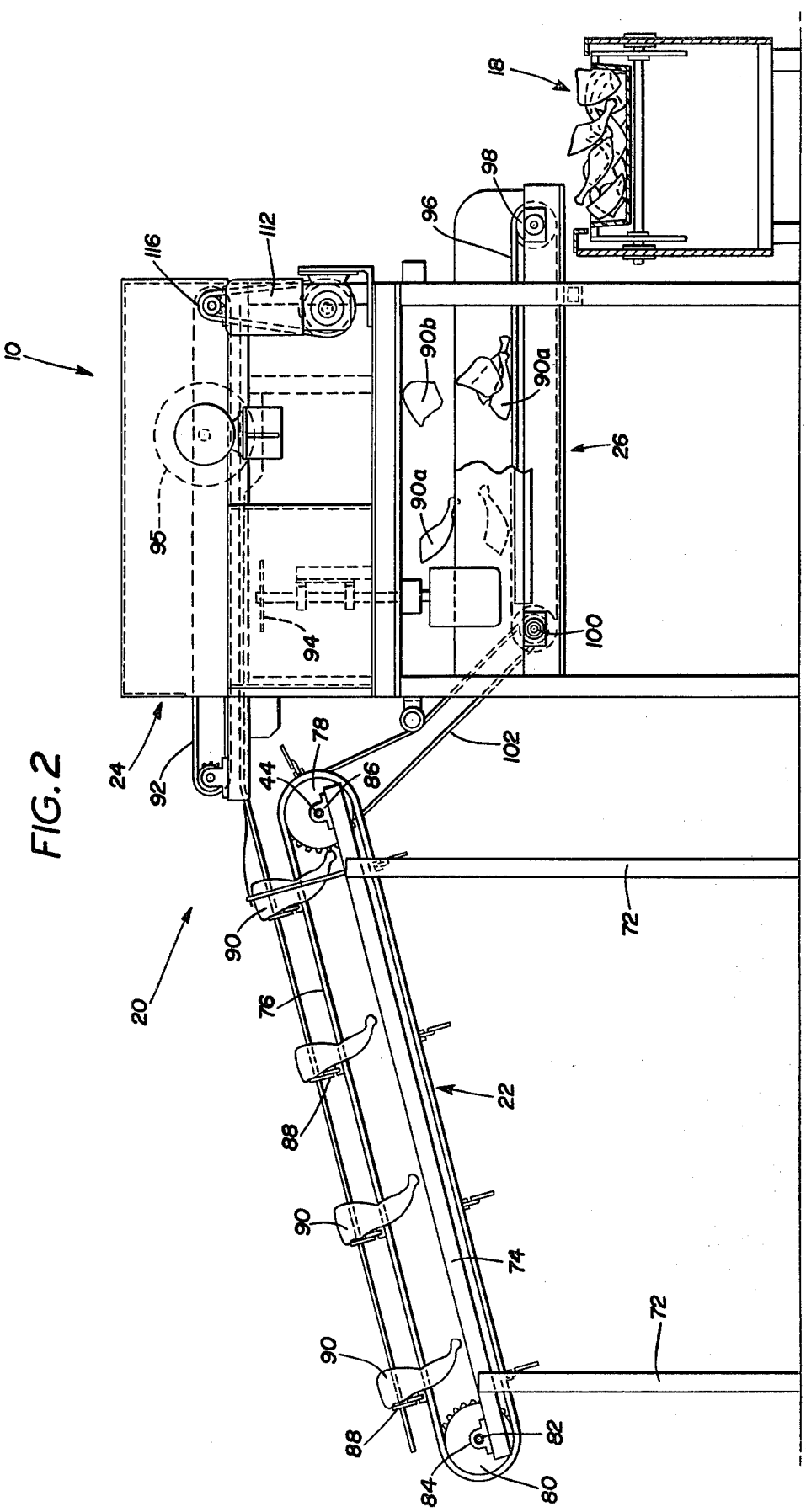
FIG. 2 is a side elevation of the rear half conveyor of the present invention.
Figure 3:
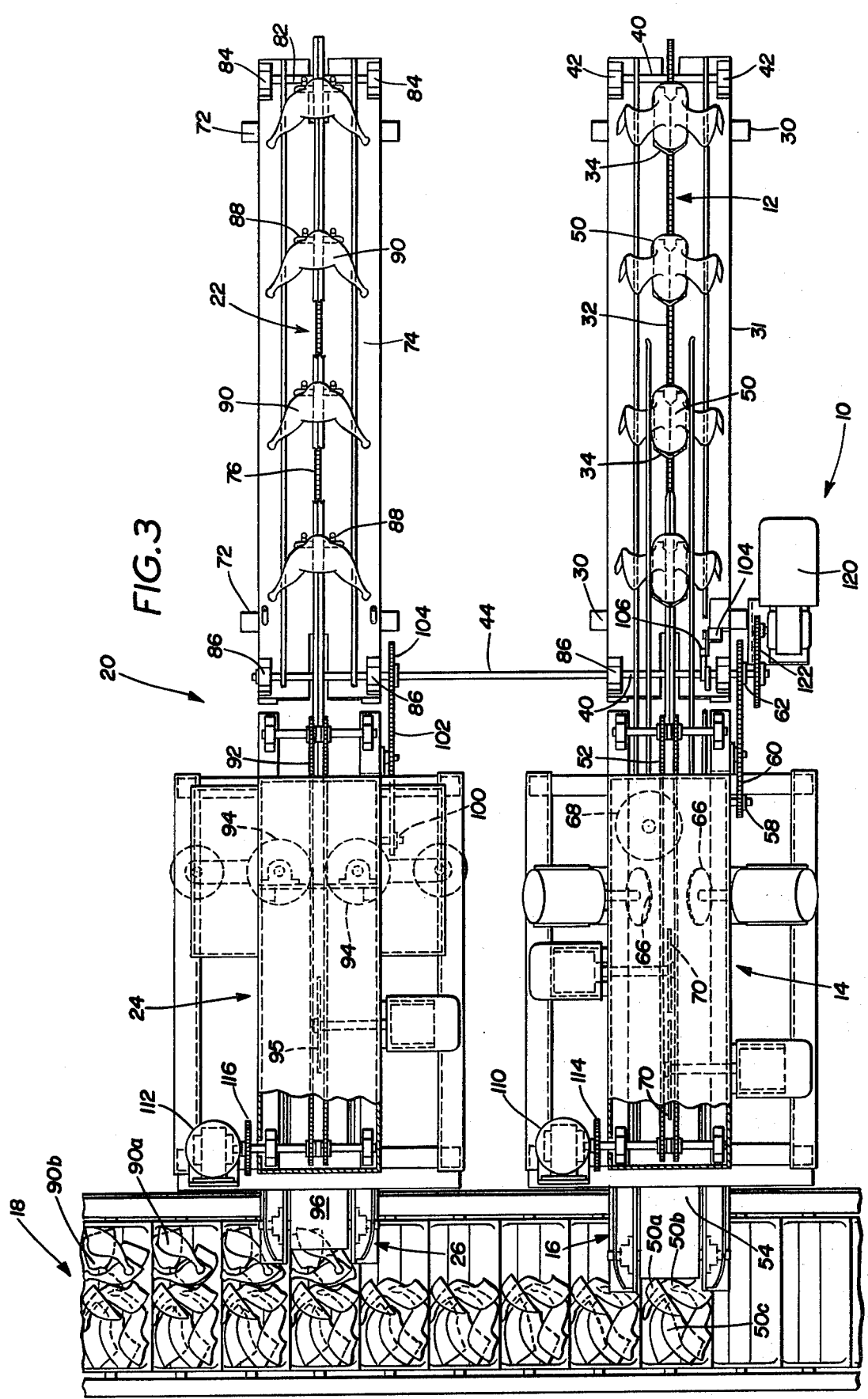
FIG. 3 is a top plan view of the apparatus of the present invention.

Referring now to the drawings and specifically to FIGS. 1 and 3, the front half cutting system is generally illustrated at 10 and includes front half feed conveyor system 12, cutter system generally illustrated at 14, delivery conveyor system generally illustrated at 16 and a bucket conveyor generally illustrated at 18. Likewise, the rear half cutting system is generally indicated at 20 (referring to FIG. 2) and includes a feed conveyor system generally indicated at 22, cutting conveyor system generally indicated at 24, and a delivery conveyor system generally indicated at 26 which discharges into bucket conveyor 18.

Feed conveyor system 12 includes frame members 30 and 31 which support an endless chain 32 to which is attached a plurality of front half chicken holders 34. The chain is driven by drive sprocket 36 and passes around idler sprocket 38, which revolves with shaft 40 that is supported on the frame by bearings 42. Drive sprocket 36 is supported by main drive shaft 44. The manner in which main drive shaft 44 is driven and its interrelations with the other components of the system will be described below.

As the front chicken halves 50 are loaded into the front half holders 34, they are conveyed to the cutting machine portion 12 where they are engaged by cutter conveyor 52 which conveys the chicken half through the front half cutter system 14. As a front half of a chicken is conveyed through the cutting system, the keel piece 50a is first removed. Next, the wings 50b are removed by an appropriate cutting wheel, and finally the remaining rib piece is split longitudinally to form rib pieces 50c.

As these pieces are cut they drop to delivery conveyor system 16 which includes an endless belt conveyor 54 which is mounted for movement around idler roll 56 and drive roll 58. Drive roll 58 is driven by chain 60, which in turn is driven by sprocket 62. Sprocket 62 is mounted on main drive shaft 44, as best seen in FIG. 3.

Both cutter conveyor 52 and endless belt conveyor 54 are driven at the same speed. Thus, when the five pieces of chicken are cut, they drop onto endless belt conveyor 54 with all five pieces from one chicken half being located in a pile together. The five pieces of chicken which comprise a keel 50a, two wings 50b and two rib sections 50c are then deposited into one of the buckets of bucket conveyor 18.

Each of the three conveyor systems 12, 14 and 16 are driven in synchronization so that a chicken half and its ultimate cut pieces move through the system in synchronization. The cutting system 14, which includes conveyor 52, also includes motor-driven wing cutting wheels 66, a keel cutting wheel 68 and rib cutters 70, each of which may be commercially purchased.

Turning now to FIGS. 2 and 3, the rear half system 20 that includes feed conveyor system 22, cutting conveyor system 24 and delivery conveyor system 26, operates in a manner similar to front half system 10. The delivery conveyor system 22 includes frame members 72 and 74, which support an endless chain 76 that is driven by drive sprocket 78 and travels around idler sprocket 80. Idler sprocket 80 is supported on the frame by shaft 82 which is mounted on bearins 84. The drive sprocket is mounted on and driven by main drive shaft 44.

Main drive shaft 44 is supported by four bearings 86, two of which are mounted on frame members 74 and the other two of which are mounted on frame members 31. The endless chain 76 carries a series of rear half holders 88 which are mounted in tandem with front half holders 34. Endless chain 32 and endless chain 76 are both driven by main drive shaft 44 and drive sprockets 36 and 78, respectively (both of which are the same size). As a consequence, a front half of a chicken and a rear half of a chicken will move along both front and rear half feed conveyors at the same speed.

Rear chicken halves 90 are loaded onto the front half holders 88 and are conveyed to the cutting system 24 where they are engaged by cutter conveyor 92 which conveys the rear half of a chicken through the cutter system 24. As the rear half is conveyed through cutting machine 24, the legs 90a are severed from the rear half by cutting wheels 94. Next, the remaining thigh portion is split longitudinally by cutting wheel 95 into two thighs 90b.

As the pieces are cut, they drop to delivery conveyor system 26 which includes an endless belt conveyor 96 that is mounted for movement around idler roll 98 and drive roll 100. Drive roll 100 is driven by chain 102, which in turn is driven by sprocket 104. Sprocket 104 is mounted on main drive shaft 44, as best seen in FIG. 3. Both cutter conveyor 92 and endless belt conveyor 96 are driven in synchronization at the same speed. Thus, when the four pieces of chicken 90a and 90b are cut, they drop onto endless belt conveyor 96 with all four pieces from one rear chicken half being located in a pile together on the conveyor 96. The four rear half pieces of chicken 90a and 90b are then deposited into one of the buckets of bucket conveyor 18, into which previously had been deposited five front half pieces.

Each of the three conveyor systems 22, 24 and 26 are driven in synchronization so that a chicken half and the pieces into which it is cut move through the system in synchronization. One of the aspects of the present invention involves the synchronization of both front and rear half feed conveyor and front and rear half cutter conveyors and front and rear half delivery conveyors. Thus, the finally cut pieces of chicken all arrive at the bucket conveyor 18 at the same time.

In order to properly fill each of the individual buckets of bucket conveyor 18, the bucket conveyor is advanced in synchronization with the remaining elements of the system. Bucket conveyor system 18, which is commercially available, is driven by a motor, not shown, and is located, as seen in FIG. 3, at the discharge end of delivery conveyors 16 and 26. As the delivery conveyors 16 and 26 deposit their respective pieces of chicken into one of the individual buckets of the conveyor system, the bucket conveyor advances one bucket position at a time. This is controlled by a switch 104 which is activated by cam member 106, which is mounted on main drive shaft 44.

Thus, in operation, an empty bucket will be positioned at the discharge of conveyor 16. At the same time delivery conveyor system 26 will deposit additional pieces of chicken into a bucket positioned at its discharge position. This bucket will have previously had pieces of chicken deposited therein by conveyor system 16. Each bucket, therefore, after passing both delivery positions of both conveyors 16 and 26, will include the nine cut pieces that comprise the parts of a single chicken.

As illustrated in FIG. 3 of the drawings, the bucket conveyor moves from bottom to top of the drawing and the other conveyors in the system move from right to left. After the buckets have been filled with the nine individual pieces which comprise one chicken they are conveyed to automatic packaging equipment which packages the contents of each individual bucket. This package machinery is not shown and is commercially available equipment.

As described above, both cutting conveyors 14 and 24 are driven in synchronization with feed conveyors 12 and 22 and delivery conveyors 16 and 26. Conveyors 12, 16, 22 and 26 are all driven by a common drive. However, cutting conveyors 14 and 24 are driven, respectively, by motors 110 and 112 that drive chain drive 114 and 116, respectively. The speed at which motors 110 and 112 operate, and thus, the speed at which cutting conveyors 52 and 92 travel, are synchronized with the speed at which conveyor systems 12, 16, 22 and 26 operate so that one whole chicken that is cut into its respective pieces, moves through the system at the same speed.

The common drive which drives conveyors 12, 16, 22 and 26 is main drive shaft 44. Main drive shaft 44 is driven by a motor 120 which drives endless chain 122, which in turn drives sprocket 124 which is mounted upon, and therefore, drives main drive shaft 44.

In the embodiment of the invention illustrated in the drawings, the front half of the chicken is cut first, with respect to the buckets to be filled, and the rear half second. It should be appreciated that the position of the front and rear half cutting systems could be reversed. Likewise, the direction of travel of the bucket conveyor could also be reversed depending on the desired layout of the equipment in the processing plant.

The methods and apparatus of the present invention achieve a number of advantages over the prior art. First, since a common drive which is driven by only one motor drives four conveyors, these four conveyors will each be driven in synchronization with one another. Thus, two halves of a chicken may be processed through the equipment in synchronization. As a result, it is possible to regroup these pieces of chicken in a container which contains the respective parts of one chicken, and the need for manual labor to place the individual parts of one chicken into a single container is eliminated with the attendant savings in cost.

It is possible to operate the equipment with two operators, one each to load the respective front and rear halves of the chicken onto the feed conveyor. It may, however, be desirable to use additional operators where quality control is of importance and wherein damaged pieces of chicken may be removed from the buckets and replaced with other similar pieces of chicken. This procedure is necessary when the quality of the individual pieces is of primary importance.

The primary advantage of the present invention is that the cut pieces of chicken are regrouped into one container which contains only those pieces of chicken which comprise a single chicken. Thus, the pieces of a single chicken can be packaged in a single package for those customers of a chicken processing plant which desire this type of packaging.

In the foregoing description, certain terms have been used for brevity, clearness and understanding but no unnecesssary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved method and apparatus for cutting chicken is constructed, assembled and operated, the characteristics of the new construction, and the advantageous, new and useful results obtained; the new and useful structures, devices, elements, arrangements, parts and combinations are set forth in the appended claims.

We claim:

1. A method of cutting poultry, that has been cut into a front half and a rear half, into pieces, including the steps of:
   (a) conveying a front half to a cutting machine;
   (b) cutting said front half into pieces;
   (c) depositing the cut pieces on a delivery conveyor;
   (d) conveying said pieces to a container;
   (e) depositing said pieces into said container;
   (f) conveying the rear half to a second cutting machine;
   (g) cutting said rear half into pieces;
   (h) depositing said pieces to a second delivery conveyor;
   (i) advancing said container to a position to receive the cut pieces of the rear half;
   (j) depositing said rear half pieces in said container; and
   (k) advancing said container to a packaging station.

2. A method of cutting poultry, as defined in claim 1, in which said front half is cut into five pieces which includes a keel piece, two wings and two rib pieces.

3. A method as defined in claim 1 in which said rear half is cut into four pieces including two legs and two thigh pieces.

4. A method as defined in claim 1 in which said conveying steps are carried out at the same speed.

5. A method of cutting poultry, as defined in claim 1, in which the steps of conveying a front half and a rear half are carried out simultaneously.

6. A method of cutting poultry, as defined in claim 1, in which the steps of depositing said front half pieces and said rear half pieces into a container are carried out simultaneously.

7. A method of cutting poultry, that has been cut into a front half and a rear half, into pieces, including the steps of:
   (a) conveying a front half to a cutting machine while simultaneously conveying a rear half to a second cutting machine;
   (b) conveying said front half and said rear half through said cutting machines to cut said front half and rear half into pieces;
   (c) depositing said front half pieces and said rear half pieces together on a delivery conveyor;
   (d) positioning a container in a position to receive the cut pieces of the front half;
   (e) depositing said front half pieces into said container;
   (f) positioning a second container containing front half pieces to a position to receive the cut pieces of the rear half; and
   (g) depositing said rear half pieces in said container.

8. A method of cutting poultry, that has been cut into a front half and a rear half, into pieces, including the steps of:
   (a) conveying the front half through a cutting machine to cut the front half into pieces;
   (b) conveying said pieces to a first deposit position;
   (c) conveying the rear half through a cutting machine to cut said rear half into pieces;
   (d) conveying said rear half pieces to a second deposit position;
   (e) providing a plurality of movable containers;
   (f) positioning one of said plurality of containers at said first deposit position and another of said containers at said second position;
   (g) simultaneously depositing the front half pieces and the rear half pieces into said containers; and
   (h) advancing said first container from said first position to said second position.

9. Apparatus for cutting poultry, that has been cut into a front half and a rear half, into pieces, including:
   (a) a front half conveyor and a rear half conveyor;
   (b) a first cutting machine for cutting the front half into pieces and a second cutting machine for cutting the rear half into pieces;
   (c) a front half delivery conveyor and a rear half delivery conveyor positioned to receive the cut pieces of chicken;
   (d) a container conveyor adapted to receive the cut pieces of chicken;
   (e) said container conveyor means movable whereby a container is positioned to receive the cut pieces of chicken from the front end delivery conveyor and movable to thereafter receive pieces from the rear half conveyor; and
   (f) common drive means for driving the front half and rear half delivery conveyor.

* * * * *